United States Patent
Hirabayashi

(10) Patent No.: US 9,804,806 B2
(45) Date of Patent: Oct. 31, 2017

(54) RIBBON PREPARATION METHOD, TAPE PRINTING DEVICE AND PROGRAM

(71) Applicant: Seiko Epson Corporation, Tokyo (JP)

(72) Inventor: Naofumi Hirabayashi, Suwa (JP)

(73) Assignee: Seiko Epson Coporation, Tokyo (JP)

( * ) Notice: Subject to any disclaimer, the term of this patent is extended or adjusted under 35 U.S.C. 154(b) by 0 days.

(21) Appl. No.: 15/079,023

(22) Filed: Mar. 23, 2016

(65) Prior Publication Data

US 2016/0291903 A1    Oct. 6, 2016

(30) Foreign Application Priority Data

Mar. 30, 2015   (JP) ................................. 2015-068990

(51) Int. Cl.
| | | |
|---|---|---|
| *G06F 3/12* | (2006.01) | |
| *G06K 15/02* | (2006.01) | |
| *B41J 3/407* | (2006.01) | |
| *B41J 11/00* | (2006.01) | |

(52) U.S. Cl.
CPC .......... *G06F 3/1205* (2013.01); *B41J 3/4075* (2013.01); *B41J 11/008* (2013.01); *G06F 3/1208* (2013.01); *G06F 3/1256* (2013.01); *G06F 3/1284* (2013.01); *G06K 15/022* (2013.01); *G06K 2215/0097* (2013.01)

(58) Field of Classification Search
CPC .... G06F 3/1205; G06F 3/1208; G06F 3/1256; G06F 3/1284; G06K 15/022; G06K 2215/0097

See application file for complete search history.

(56) References Cited

U.S. PATENT DOCUMENTS

| | | | |
|---|---|---|---|
| 2007/0177201 A1 | 8/2007 | Tanaka et al. | |
| 2013/0045851 A1* | 2/2013 | Hori | G03G 15/5095 493/405 |
| 2014/0289292 A1* | 9/2014 | Hosokawa | B65H 19/12 708/105 |
| 2014/0293336 A1* | 10/2014 | Endo | G06K 15/1882 358/1.15 |
| 2015/0022614 A1 | 1/2015 | Guan et al. | |
| 2016/0189013 A1* | 6/2016 | Sano | G06K 15/022 358/1.5 |

FOREIGN PATENT DOCUMENTS

JP          2014-180836 A       9/2014

OTHER PUBLICATIONS

European Search Report issued in related Patent Application No. EP-16162726, dated Aug. 22, 2016.

* cited by examiner

*Primary Examiner* — Iriana Cruz
(74) *Attorney, Agent, or Firm* — ALG Intellectual Property, LLC

(57) ABSTRACT

A tape printing device includes: a display unit which displays a printable area on a ribbon decoration preview which is a preview of a completed ribbon decoration; an input unit which input information; an acquisition unit which acquires the inputted information; and a print data generation unit which generates print data for printing a print image based on the acquired information, on a ribbon tape. The print data generation unit decides a print position of the print image on the ribbon tape according to an arrangement of the printable area on the ribbon decoration preview.

11 Claims, 14 Drawing Sheets

RIBBON PREPARATION METHOD, TAPE PRINTING DEVICE AND PROGRAM

CROSS-REFERENCE TO RELATED APPLICATION

The entire disclosure of Japanese Patent Application No. 2015-068990, filed Mar. 30, 2015 is expressly incorporated by reference herein.

BACKGROUND

1. Technical Field

The present invention relates to a ribbon preparation method, a tape printing device and a program, for printing on a ribbon tape.

2. Related Art

According to the related art, JP-A-2014-180836 is known as a technique of this type. JP-A-2014-180836 discloses a tape length calculation device which calculates the length of a ribbon tape required for ribbon wrapping and ribbon decoration according to the dimensions of an object to be wrapped and the type of ribbon decoration (ribbon bow) set by the user. JP-A-2014-180836 also discloses printing a print image on a ribbon tape on the basis of information inputted by the user.

However, the technique of JP-A-2014-180836 does not take in consideration which position on the ribbon tape the print image is to be printed at. Therefore, there is a risk that the print image may be arranged at a position that is not intended by the user, such as at the knot of the ribbon decoration or on the back of the object to be wrapped (the back surface in the case where the surface with the ribbon decoration is the top surface). Particularly in the case of preparing an original ribbon tape as in JP-A-2014-180836, a message with the creator's personal feelings is likely to be printed on the ribbon tape and the ribbon tape is often used for wrapping gifts. Therefore, the user strongly wishes to deliver his or her message in a proper state. Also, in view of decorative aesthetics, it is desirable that a print image can be printed at a position suitable for the shape of a ribbon decoration, for example, a print image being printed on the tails of a "bow".

SUMMARY

An advantage of some aspects of the invention is to provide a ribbon preparation method, a tape printing device and a program that enable a print image expressing a user's message or the like to be printed at a proper position on a ribbon tape used for wrapping.

A ribbon preparation method according to an aspect of the invention includes: displaying a printable area on a ribbon decoration preview which is a preview of a completed ribbon decoration; acquiring information for printing a print image; and printing the print image based on the acquired information, on a ribbon tape. In the printing of the print image, a print position of the print image on the ribbon tape is decided according to an arrangement of the printable area on the ribbon decoration preview.

A tape printing device according to another aspect of the invention includes: a display unit which displays a printable area on a ribbon decoration preview which is a preview of a completed ribbon decoration; an acquisition unit which acquires information for printing a print image; and a printing unit which prints the print image based on the information acquired by the acquisition unit, on a ribbon tape. The printing unit decides a print position of the print image on the ribbon tape according to an arrangement of the printable area on the ribbon decoration preview.

A program according to still another aspect of the invention causes a computer to execute: displaying a printable area on a ribbon decoration preview which is a preview of a completed ribbon decoration; acquiring information for printing a print image; and generating print data for printing the print image based on the acquired information, on a ribbon tape. In the generating of the print data, a print position of the print image on the ribbon tape is decided according to an arrangement of the printable area on the ribbon decoration preview.

According to these configurations, since the print position of the print image on the ribbon tape is decided according to the arrangement of the printable area on the ribbon decoration preview, the print image can be printed at a proper position on the ribbon tape. That is, the arrangement of the printable area on the ribbon decoration preview and the arrangement of the print image on the ribbon decoration in the case where the ribbon decoration is completed with the prepared ribbon tape correspond to each other. Therefore, the print image is prevented from being arranged at a position that is not intended by the user when the ribbon decoration is completed.

The printable area may be arranged at a plurality of positions on the ribbon decoration preview.

The ribbon preparation method may further include setting a type of the ribbon decoration. In the displaying of the printable area, the ribbon decoration preview may be displayed and the printable area may be arranged on the ribbon decoration preview according to the type of the ribbon decoration that is set.

According to this configuration, the print image can be printed at a proper position on the ribbon tape according to the type of the ribbon decoration.

The "type of the ribbon decoration" refers to single-loop bow (with a knot, without a knot), double-loop bow (with a knot, without a knot), awareness ribbon, flower bow, Dior bow, or the like.

The ribbon preparation method may further include calculating a length of the ribbon tape necessary for preparing the ribbon decoration, according to the type of the ribbon decoration that is set. In the printing of the print image, the ribbon tape may be cut to the calculated length, or a cut mark may be printed on the basis of the length.

According to this configuration, since the ribbon tape is cut to secure a proper length or a cut mark for manual cutting is printed according to the type of the ribbon decoration, wasting of the ribbon tape can be prevented.

In the ribbon preparation method, in the setting of the type of the ribbon decoration, a dimension of an object to be wrapped may be set. In the calculation of the length of the ribbon tape, the length of the ribbon tape necessary for preparation of the ribbon decoration and for ribbon wrapping on the object to be wrapped may be calculated according to the dimension of the object to be wrapped that is set.

According to this configuration, since the ribbon tape is cut to secure a proper length or a cut mark for manual cutting is printed according to the dimension of the object to be wrapped, wasting of the ribbon tape can be prevented.

In the calculation of the length of the ribbon tape, the lengths necessary for the preparation of the ribbon decoration and for the ribbon wrapping may be totaled, or the lengths necessary for the preparation of the ribbon decoration and for the ribbon wrapping may be separately calculated. In the former case, one ribbon tape is prepared. In the latter case, two ribbon tapes are prepared.

In the ribbon preparation method, in the displaying of the printable area, an object preview which is a preview of the object to be wrapped, a ribbon wrapping preview which is a preview of the ribbon tape wrapped around the object to be wrapped, and the ribbon decoration preview may be displayed, and the printable area may be displayed on the ribbon wrapping preview and the ribbon decoration preview. In the acquisition of the information, the information that is different from one of the printable areas to another can be acquired.

According to this configuration, the print image can be printed not only at the part that forms the ribbon decoration but also at the part used for ribbon wrapping, of the ribbon tape. Also, different messages can be printed according to the print position of the print image.

In the ribbon preparation method, in the setting of the type of the ribbon decoration, a type of ribbon wrapping around the object to be wrapped may be set. In the displaying of the printable area, the ribbon wrapping preview may be displayed and the printable area may be arranged on the ribbon wrapping preview, according to the type of the ribbon wrapping that is set. In the calculation of the length of the ribbon tape, the length of the ribbon tape may be calculated according to the type of the ribbon wrapping that is set.

According to this configuration, the print image can be printed at a proper position on the ribbon tape according to the type of the ribbon wrapping. Also, since the ribbon tape is cut to secure a proper length according to the type of the ribbon wrapping, wasting of the ribbon tape can be prevented.

The ribbon preparation method may further include picking up an image of the object to be wrapped. In the setting of the type of the ribbon decoration, the dimension of the object to be wrapped may be set according to a result of the image pickup.

According to this configuration, since the dimension of the object to be wrapped is set according to the result of the image pickup of the object to be wrapped, the accurate dimension can be set and the time and effort of the user inputting the dimension can be saved.

When picking up an image of the object to be wrapped, the condition that a scale or predetermined comparative object should be included in the image pickup area may be employed. According to this configuration, the dimension of the object to be wrapped can be set more accurately.

In the ribbon preparation method, in the printing of the print image, a mark indicating at least one of a position to start wrapping around the object to be wrapped, a position to be applied at a corner of the object to be wrapped, a preparation target range of the ribbon decoration, a knot position of the ribbon decoration, and a ribbon overlapping position of the ribbon decoration, may be printed on the ribbon tape.

According to this configuration, the user can achieve wrapping (ribbon wrapping and preparation of the ribbon decoration) with a pleasant appearance, using the mark printed on the ribbon tape as a reference.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the ribbon preparation method, the tape printing device and the program according to the embodiment will be described with reference to the accompanying drawings. In the following embodiments, the tape printing method according to the invention is implemented with a mobile terminal 1 and a tape printing device 3. In a first embodiment, the preparation of a ribbon tape T for ribbon decoration is described. In a second embodiment, the preparation of a ribbon tape T for wrapping (ribbon wrapping and ribbon decoration) is described.

First Embodiment

Figure 1:
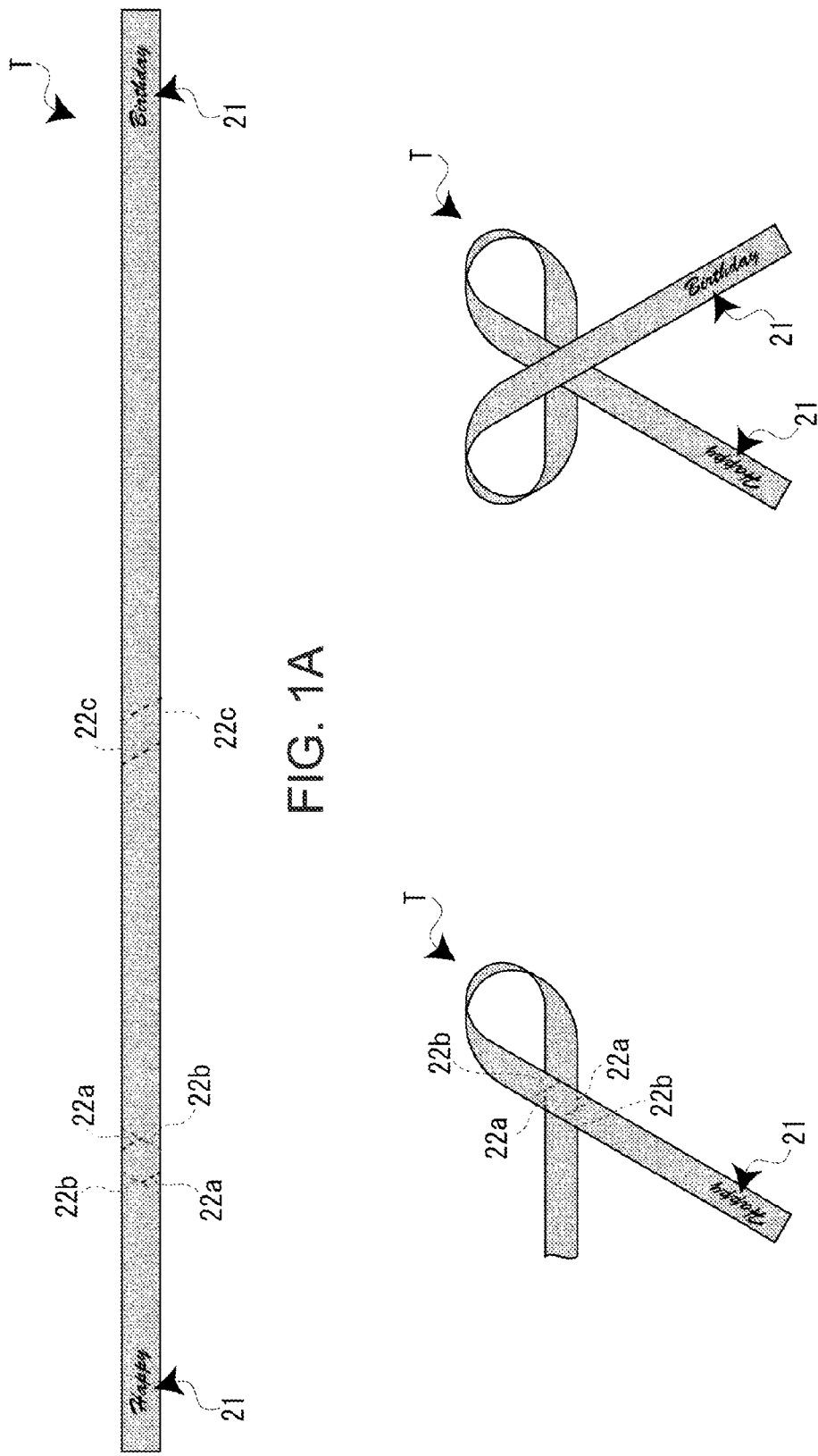
FIG. 1A shows an example of preparation of a ribbon tape.
FIG. 1B shows the state during the preparation of a ribbon decoration.
FIG. 1C shows the state where the ribbon decoration is completed.

In the first embodiment, the ribbon tape T shown in FIG. 1A is prepared. In FIG. 1A, the reference number 21 denotes a print image based on information inputted by the user. The print image 21 is can be printed at one or more predetermined print positions on the ribbon tape T according to the type of the ribbon decoration. The dotted lines denoted by the reference numbers 22a to 22c indicate guides (marks) which serve as indicators when preparing a ribbon decoration with the ribbon tape T. The shapes and print positions of the guides 22 are also determined in advance according to the type of the ribbon decoration. The "ribbon decoration" refers to a decoration prepared by a technique such as tying the ribbon tape T, forming a loop with the ribbon tape T, superimposing parts of the ribbon tape T, or wrapping the ribbon tape T around.

FIG. 1B shows the state where the left end of the ribbon tape T of FIG. 1A is directed obliquely downward to the left and where a center part of the ribbon tape T is twisted to form a loop. At this point, the user forms the loop in such a way that the guides 22a and 22c overlap with each pair of sides of a parallelogram forming a loop intersection part (overlapping area of the two parts of the ribbon tape T). FIG. 1C shows the state where the other end of the ribbon tape T (right end in the state of FIG. 1A) is twisted from the state of FIG. 1B so as to form the other loop and where the other end of the ribbon tape T is directed obliquely downward to the right so that the first loop intersection part and the second loop intersection part overlap with each other. At this point, the user forms the loop in such a way that the guides 22b overlap with a pair of sides of a parallelogram (rhombus) forming a loop intersection part (overlapping area of the three parts of the ribbon tape T).

FIG. 1C shows the completed form of a "single-loop bow (without a knot)", which is a type of ribbon decoration. As shown in FIG. 1C, in this embodiment, the print position of the print image 21 on the ribbon tape T is decided in such a way that the print image 21 is arranged at a proper position (in the illustrated example, the two tails of the bow) in the state where the ribbon decoration is prepared (completed). Details will be described later.

Figure 2:
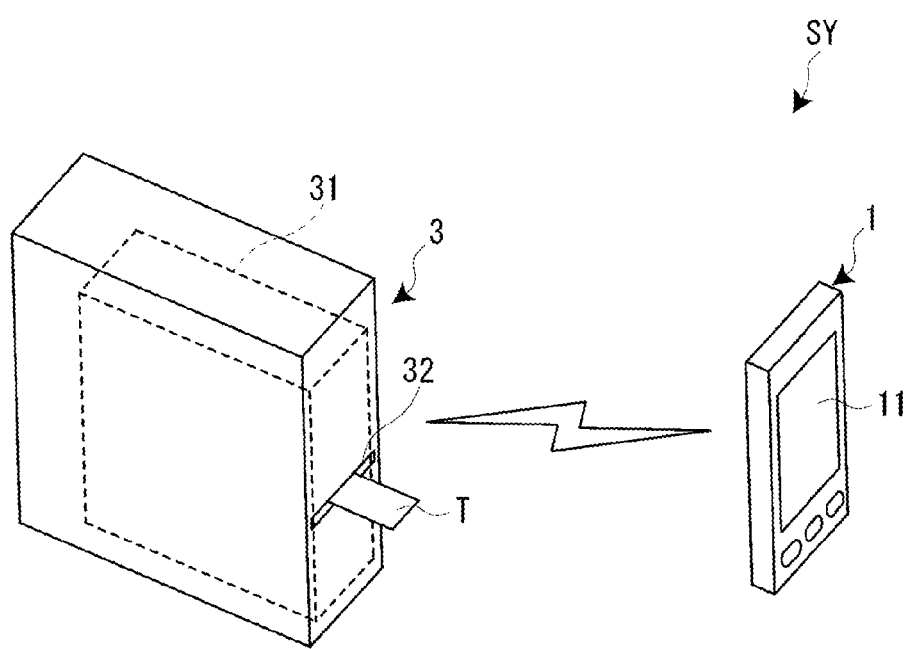
FIG. 2 shows the configuration of a print system.

FIG. 2 shows the configuration of a print system SY according to an embodiment of the invention. The print system SY includes the mobile terminal 1 and the tape printing device 3. The mobile terminal 1 is implemented by one of various tablet terminals, smartphone (mobile phone), laptop personal computer and the like. FIG. 2 shows an example in which a smartphone equipped with a touch panel 11 is used as the mobile terminal 1. The mobile terminal 1 communicates with the tape printing device 3 via wireless communication of Bluetooth (trademark registered) or the like. For the communication between the mobile terminal 1 and the tape printing device 3, wired communication standards such as USB communication or Ethernet (trademark registered) may also be used.

In the tape printing device 3, a tape cartridge 31 accommodating a long ribbon tape T and an ink ribbon is loaded, and when print data is received from the mobile terminal 1, print processing and cutting processing are performed while the ribbon tape T is reeled off from the tape cartridge 31. The printed part of the ribbon tape T is discharged through a tape discharge port 32 after the cutting processing. A cut mark (a straight line extending in the direction of tape width, or the like) for manually cutting the printed part may be printed, instead of the cutting processing.

Figure 3:
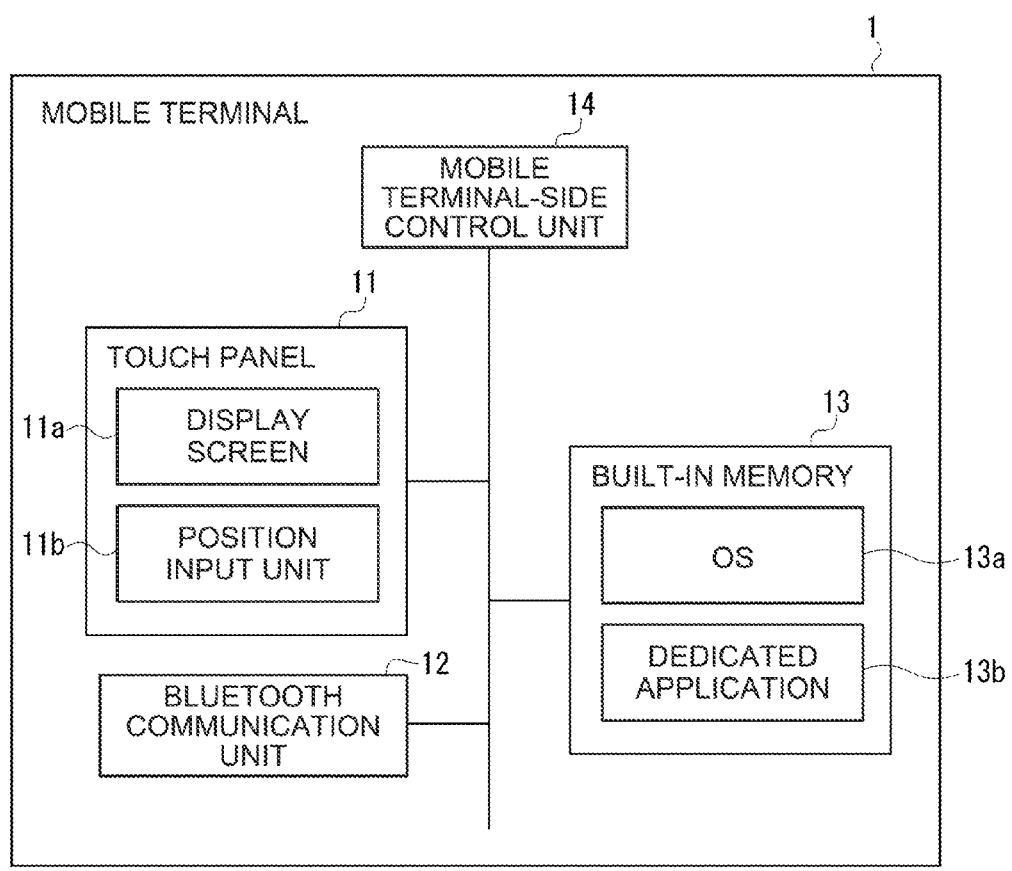
FIG. 3 is a block diagram showing the hardware configuration of a mobile terminal.

Next, the hardware configurations of the mobile terminal 1 and the tape printing device 3 will be described, referring to FIGS. 3 and 4. FIG. 3 is a block diagram of the mobile terminal 1. The mobile terminal 1 has, as its hardware configuration, the touch panel 11, a Bluetooth communication unit 12, a built-in memory 13, and a mobile terminal-side control unit 14.

The touch panel 11 includes a display screen 11a and a position input unit 11b. The display screen 11a is implemented by a liquid crystal panel or the like and displays various kinds of information such as a setting screen D1 and a text editing screen D2, described later (see FIGS. 6 and 7). Meanwhile, the position input unit 11b detects an operation position by the user by a resistance film method or an electrostatic capacitance method. The Bluetooth communication unit 12 performs pairing with the tape printing device 3 so as to establish connection according to the Bluetooth communication standard and then performs wireless communication.

The built-in memory 13 is implemented, for example, by a flash ROM (trademark registered) and stores an OS (operating system) 13a and a dedicated application 13b. The dedicated application 13b is a smartphone application for editing text (information) to be printed on the ribbon tape T and for instructing the tape printing device 3 to print. The setting screen D1 and the text editing screen D2 are displayed as one of the functions of the dedicated application 13b.

The mobile terminal-side control unit 14 is implemented by a CPU (central processing unit), a RAM (random access memory) and the like, and performs print data generation processing and communication control with the tape printing device 3, in collaboration with each of the foregoing units (reference numbers 11 to 13).

Figure 4:
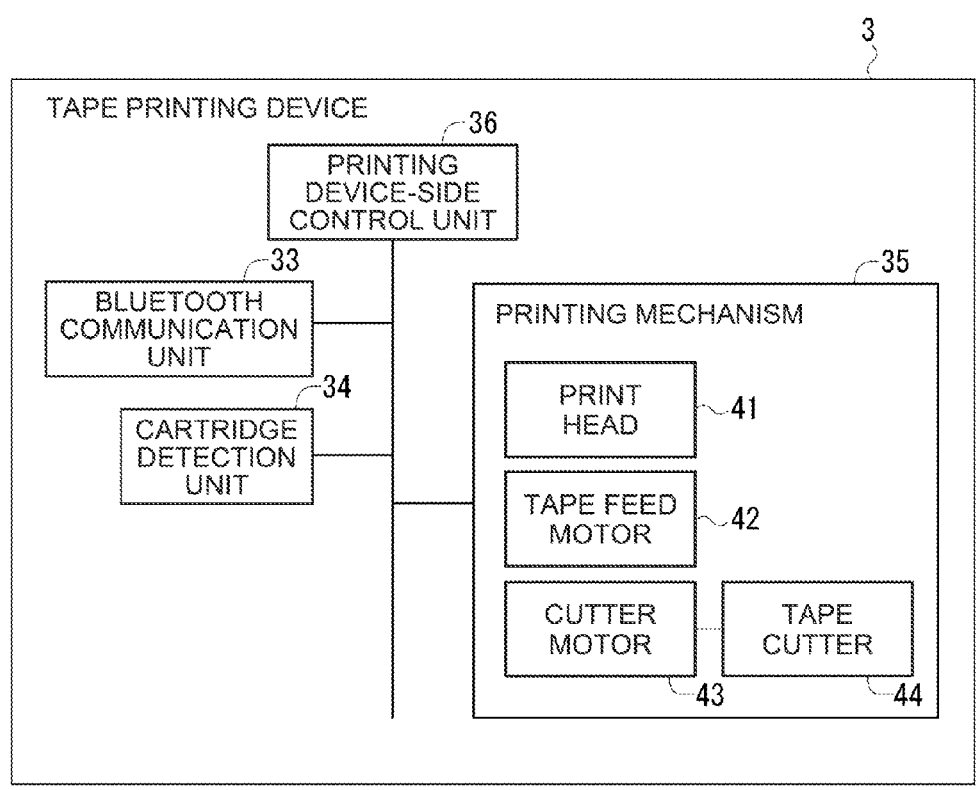
FIG. 4 is a block diagram showing the hardware configuration of a tape printing device.

FIG. 4 is a block diagram of the tape printing device 3. The tape printing device 3 has, as its hardware configuration, a Bluetooth communication unit 33, a cartridge detection unit 34, a printing mechanism 35, and a printing device-side control unit 36.

The Bluetooth communication unit 33 communicates with the mobile terminal 1 on the basis of the Bluetooth communication standard. The cartridge detection unit 34 detects tape information about the ribbon tape T accommodated in the tape cartridge 31. As the tape information, the tape type, tape width, tape color, letter color (ink color) and the like of the ribbon tape T are detected. In this embodiment, the tape type is information indicating whether the ribbon tape T is a pinked ribbon with its edge pinked or a normal ribbon without having its edge pinked, or the like. As the detection method, reading a code image (barcode or two-dimensional code) or RFID (radio frequency identification) bonded or printed on the tape cartridge 31, detecting the presence/absence of one or more holes formed in the tape cartridge 31, or the like, is conceivable.

The printing mechanism 35 includes a print head 41, a tape feed motor 42, a cutter motor 43, and a tape cutter 44. The print head 41 is a thermal head and performs printing with the ribbon tape T and the ink ribbon that are reeled off sandwiched between the print head 41 and a platen roller (not illustrated). The tape feed motor 42 carries the ribbon tape T that is reeled off, from the print head 41 toward the tape discharge port 32 (see FIG. 2). The cutter motor 43 drives the tape cutter 44 to cut the printed part of the ribbon tape T in the direction of tape width in the state where the tape feeding is temporarily stopped.

The printing device-side control unit 36 is implemented by a CPU, a RAM and the like and performs communication control with the mobile terminal 1 and print control, in collaboration with each of the foregoing units (reference numbers 33 to 35). Specifically, when the tape cartridge 31 is loaded, when communication with the mobile terminal 1 is established, or when an inquiry is sent from the mobile terminal 1, the printing device-side control unit 36 transmits the tape information detected by the cartridge detection unit 34 to the mobile terminal 1 via the Bluetooth communication unit 33. Also, the printing device-side control unit 36 receives print data from the mobile terminal 1 via the Bluetooth communication unit 33 and controls the printing mechanism 35 on the basis of the print data.

Next, the functional configurations of the mobile terminal 1 and the tape printing device 3 will be described, referring to FIG. 5. The mobile terminal 1 has, as its functional configuration, a display unit 51, a setting unit 52, a calculation unit 53, an input unit 54, an acquisition unit 55, a print data generation unit 56, and a communication unit 57. These functions are provided mainly by the dedicated application 13b (see FIG. 3). The tape printing device 3 has, as its functional configuration, a communication unit 61, a printing unit 62, and a cutting unit 63. The printing of the print image on the ribbon tape as described in the appended claims is implemented by the print data generation unit 56, the communication unit 57, the communication unit 61, the printing unit 62, and the cutting unit 63.

The display unit 51 displays a ribbon decoration preview 71 which is a preview of a completed ribbon decoration, in a preview display area E4 in the text editing screen D according to the setting by the setting unit 52. On the ribbon decoration preview 71, one or more printable areas 80 decided according to the type of the ribbon decoration are displayed. Different texts (information) can be inputted in the respective printable areas 80.

The setting unit 52 sets the type of the ribbon decoration. In this embodiment, as the type of the ribbon decoration, one of "single-loop bow (without a knot)", "single-loop bow (with a knot)", "double-loop bow (without a knot)", "double-loop bow (with a knot)" and the like can be selected (see the ribbon decoration selection area E1 in FIG. 6). The "single-loop bow" is a bow decoration with one loop each on the left and right. The "double-loop bow" is a bow decoration with two loops each on the left and right. The "without a knot" refers to the preparation of a ribbon decoration completed by making parts of the ribbon tape T overlap with each other (see FIG. 1C). The "with a knot" refers to the preparation of a ribbon decoration completed by tying the ribbon tape T (see FIGS. 8A and 8B). As other types of ribbon decoration, those generally called "ribbon bows" such as flower bow and Dior bow, and awareness ribbon or the like may be made selectable. The setting content (type of the ribbon decoration) by the setting unit 52 is reflected on the display unit 51 (text editing screen D2).

The calculation unit 53 calculates the length of the ribbon tape T necessary for preparing the ribbon decoration, according to the type of the ribbon decoration set by the setting unit 52. As the calculation method, for example, reading out the length of the ribbon tape T from a table in which the type of the ribbon decoration and the length of the ribbon tape T correspond to each other, calculating the length of the ribbon tape T according to a predetermined algorithm using the type of the ribbon decoration as a parameter, or the like, is conceivable. Also, the length of the ribbon tape T may be calculated in consideration of the tape width detected by the cartridge detection unit 34 as well as the type of the ribbon decoration.

The input unit 54 inputs a text (information) via an operation on the touch panel 11. The acquisition unit 55 acquires the text inputted by the input unit 54. The text acquired by the acquisition unit 55 is reflected on the display unit 51 (text editing screen D2).

The print data generation unit 56 generates print data for printing, on the ribbon tape T, the print image 21 based on the text acquired by the acquisition unit 55 and the guides 22 (see FIGS. 1A to 1C) serving as indicators at the time of preparing the ribbon decoration, and for cutting the ribbon tape T to the length calculated by the calculation unit 53. The image data for printing the guides 22 and information indicating its print position are stored in advance as a part of the dedicated application 13b.

The print position of the print image 21 on the ribbon tape T and the printable area 80 on the ribbon decoration preview 71 are also stored in advance as apart of the dedicated application 13b. That is, the print data generation unit 56 in this embodiment decides the print position of the print image 21 on the ribbon tape T in such a way that the arrangement of the printable area 80 on the ribbon decoration preview 71 and the arrangement of the print image 21 on the actually completed ribbon decoration coincide with each other. The communication unit 57 transmits the print data generated by the print data generation unit 56 to the tape printing device 3.

Meanwhile, the communication unit 61 of the tape printing device 3 receives the print data from the mobile terminal 1. The printing unit 62 prints the print image 21 and the guides 22 (see FIGS. 1A to 1C) on the ribbon tape T with the print head 41 on the basis of the print data received by the communication unit 61. The cutting unit 63 cuts the ribbon tape T with the tape cutter 44 on the basis of the print data received by the communication unit 61.

Figure 6:
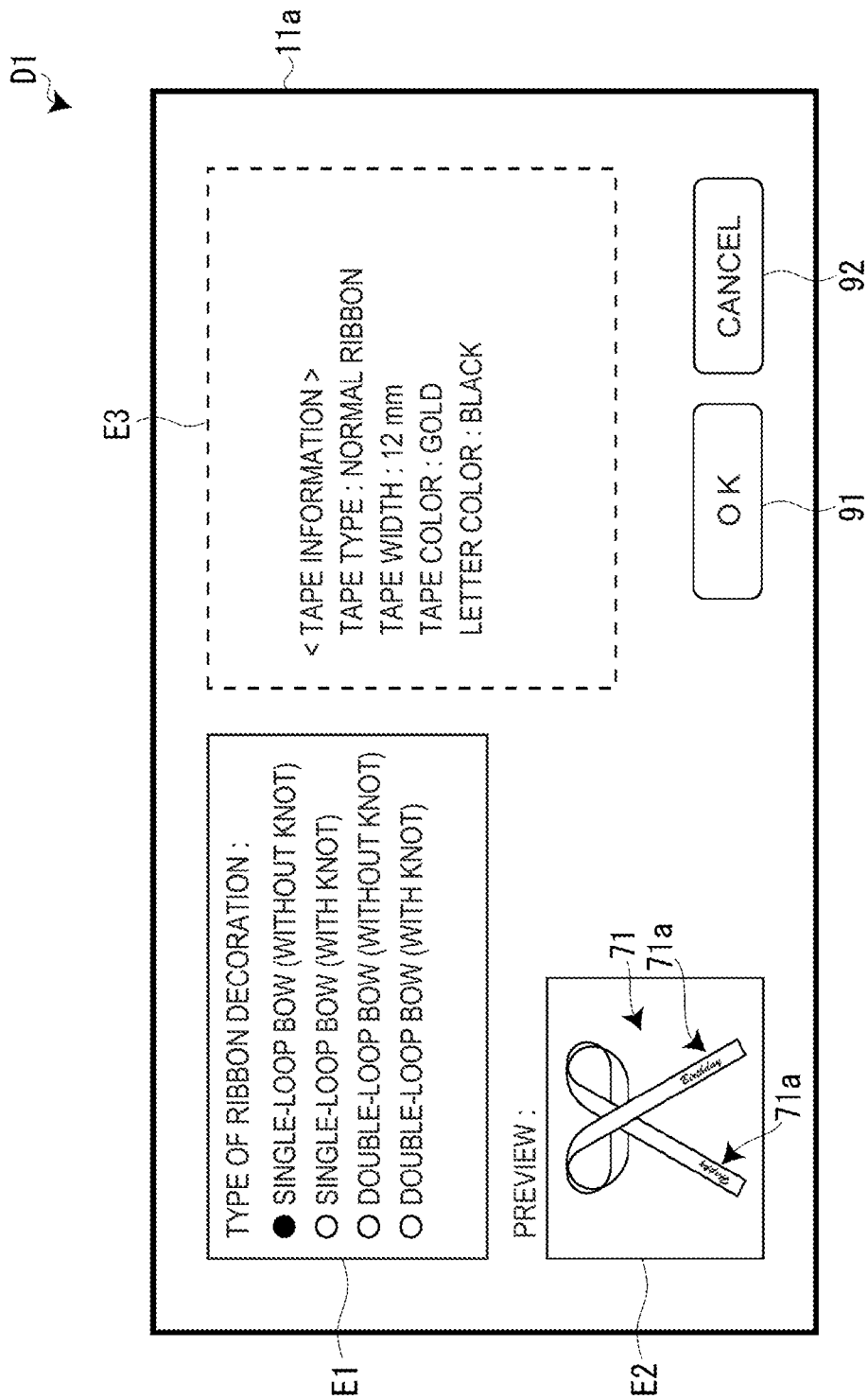
FIG. 6 shows an example of a setting screen according to a first embodiment.
Figure 7:
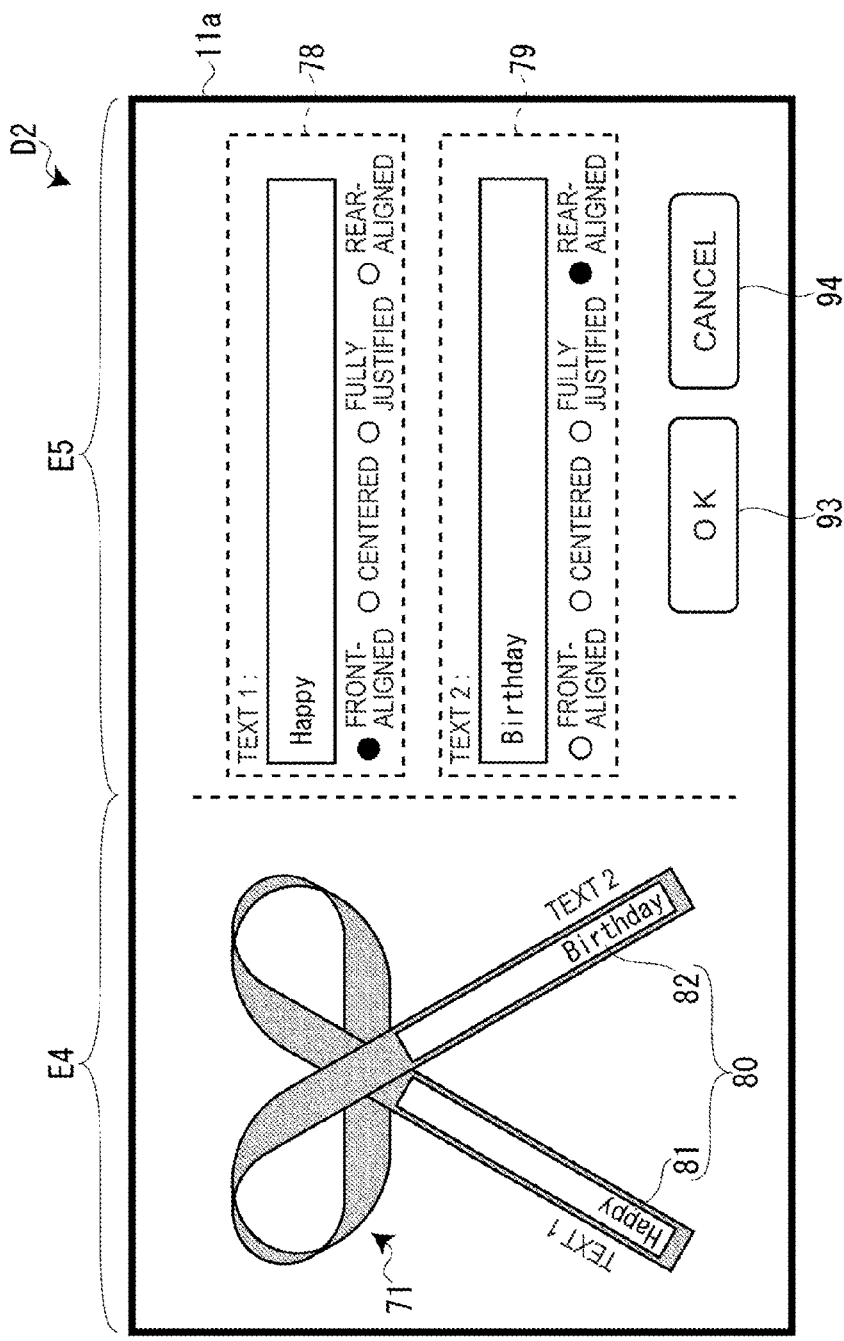
FIG. 7 shows an example of a text editing screen according to the first embodiment.

Next, the setting screen D1 and the text editing screen D2 will be described, referring to FIGS. 6 and 7. FIG. 6 shows an example of display of the setting screen D1. The setting screen D1 includes a ribbon decoration selection area E1, a preview sample display area E2, a tape information display area E3, a first OK button 91, and a first cancel button 92. If the first OK button 91 is pressed, the setting on the setting screen D1 is completed and the text editing screen D2 shown in FIG. 7 is displayed. Meanwhile, if the first cancel button 92 is pressed, the setting on the setting screen D1 is canceled. In this embodiment, the text is edited after various settings are made. However, it is also possible to make various settings after editing the text.

In the ribbon decoration selection area E1, one of four types of ribbon decoration is selected. The setting unit 52 sets the type of the ribbon decoration on the basis of the result of the selection. In the preview sample display area E2, the ribbon decoration preview 71 corresponding to the type selected in the ribbon decoration selection area E1 is displayed. On the ribbon decoration preview 71, a sample text 71a is displayed so that the user can easily imagine the completed form.

In the tape information display area E3, the tape information (tape type, tape width, tape color, letter color), which is the result of the detection by the cartridge detection unit 34, is displayed. The tape information is reflected on the ribbon decoration preview 71 displayed in the text editing screen D2.

FIG. 7 shows an example of display of the text editing screen D2. The text editing screen D2 includes a preview display area E4, a text editing area E5, a second OK button 93, and a second cancel button 94. If the second OK button 93 is pressed, the setting on the text editing screen D2 is completed and a print execution screen, not illustrated, is displayed. On the print executions screen, the execution of printing is designated by pressing a print button. Meanwhile, if the second cancel button 94 is pressed, the editing content on the text editing screen D2 is canceled.

In the preview display area E4, one or more printable areas 80 are displayed on the ribbon decoration preview 71. In the illustrated example, the case where the "single-loop bow (without a knot)" is selected as the type of the ribbon decoration is shown. In this case, two printable areas 81, 82 are displayed.

The text editing area E5 is an area where a text is inputted. In the illustrated example, two text input areas 78, 79 for "text 1" and "text 2" are displayed, corresponding to the two printable areas 81, 82. The length of the text input frames of the respective text input areas 78, 79 correspond to the lengths of the respective printable areas 81, 82. That is, the number of letters that can be inputted in the respective text input frames is limited according to the lengths of the corresponding printable areas 81, 82. Also, the letters inputted in the respective text input frames are reflected on the printable areas 81, 82.

In each of the text input areas 78, 79, one of the arrangements of the text ("front-aligned", "centered", "fully justified", "rear-aligned") can be selected. The text is inputted in the respective printable areas 81, 82 according to the result of the selection. The front and rear of the printable area 80 can be distinguished according to the letters of the "text 1" and the "text 2" arranged near the printable area 80. Also, though not particularly illustrated, the font size and font type of the text may be made selected, other than the arrangement of the text.

The example of the preparation of the ribbon tape T based on the setting screen D1 of FIG. 6 and the text editing screen D2 of FIG. 7 is as shown in FIG. 1A. The user completes the ribbon decoration shown in FIG. 1C by bending the ribbon tape T and superimposing parts of the ribbon tape T along the guides 22 according to the foregoing procedures.

As described above, according to the first embodiment, the print position of the print image 21 on the ribbon tape T is decided in such a way that the arrangement of the printable area 80 on the ribbon decoration preview 71 displayed in the preview display area E4 and the arrangement of the print image 21 on the completed ribbon decoration coincide with each other. Therefore, the print image 21 is prevented from being arranged at a position that is not intended by the user when the ribbon decoration is completed. Also, since the text arbitrarily inputted by the user can be printed on the ribbon tape T, a highly original ribbon decoration with the user's personal feelings can be prepared.

In the embodiment, since the type of the ribbon decoration can be selected, a ribbon decoration corresponding to the user's preference can be prepared. Also, since the ribbon tape T is cut to a proper length according to the type of the ribbon decoration selected by the user, wasting of the ribbon tape T can be prevented.

Second Embodiment

Next, the second embodiment of the invention will be described, referring to FIGS. 8A to 12B. In the first embodiment, the ribbon tape T for ribbon decoration is prepared, whereas in this embodiment, a ribbon tape T for wrapping is prepared. Hereinafter, only different features from the first embodiment are described. In this embodiment, components similar to those in the first embodiment are denoted by similar reference numbers and detailed description is omitted. Also, modifications applied to components similar to those in the first embodiment are similarly applied to this embodiment.

Figure 5:
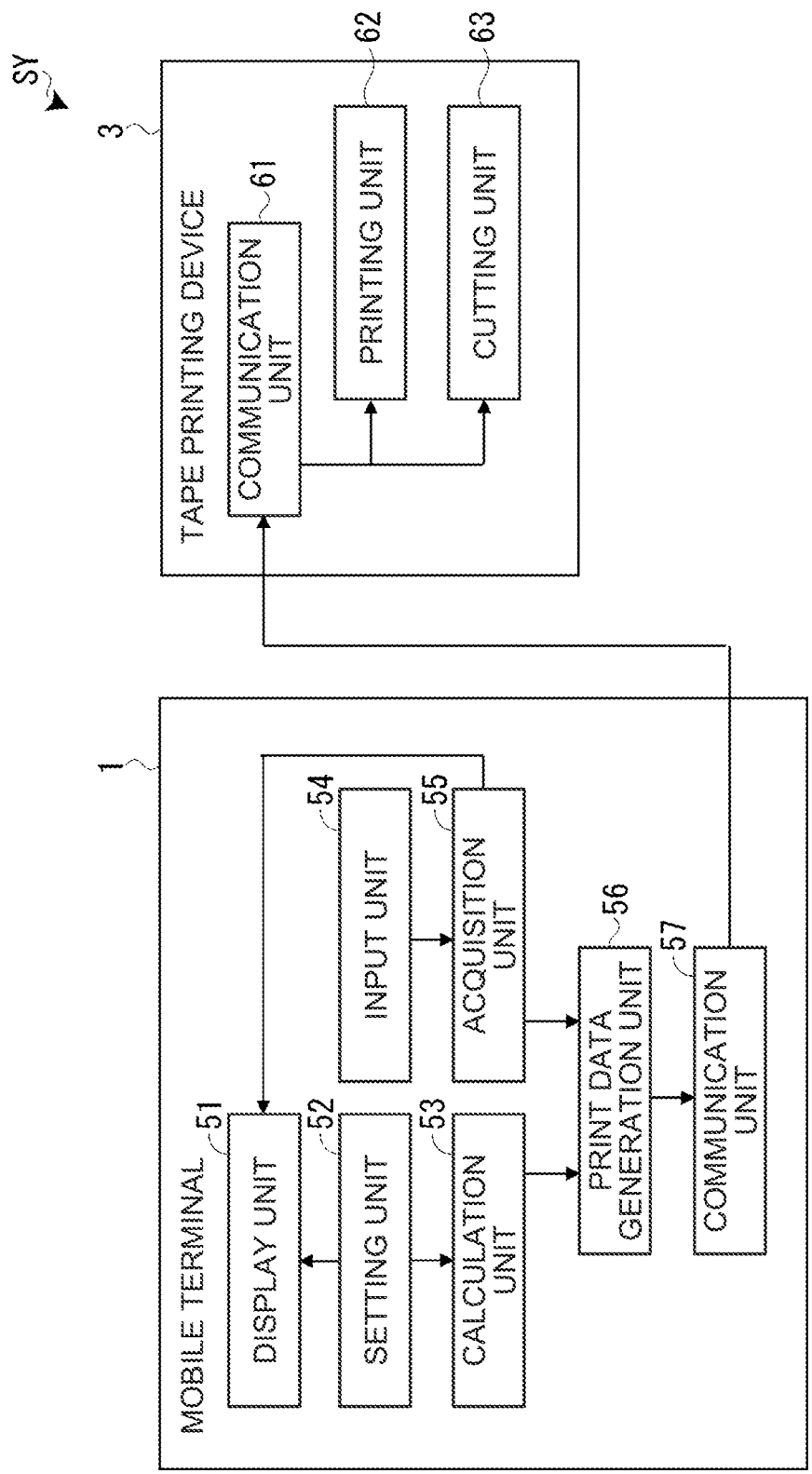
FIG. 5 is a block diagram showing the functional configurations of the mobile terminal and the tape printing device.

The functional configuration of the print system SY according to this embodiment is similar to that in the first embodiment (see FIG. 5). However, the setting unit 52 in this embodiment sets the dimensions of an object to be wrapped B and the type of ribbon wrapping on the object to be wrapped B, in addition to the type of the ribbon decoration. The "ribbon wrapping" refers to laying the ribbon tape T along the surfaces of the object to be wrapped B. The "wrapping" refers to laying the ribbon tape T around the object to be wrapped B and preparing a ribbon decoration for decorating the object to be wrapped B.

The calculation unit 53 in this embodiment calculates the length of the ribbon tape T according to the setting by the setting unit 52. That is, the length of the ribbon tape T necessary for carrying out the ribbon wrapping and ribbon decoration of the set type on the object to be wrapped B with the set dimensions is calculated. In this embodiment, if the "with a knot" is selected as the type of the ribbon decoration, the length of the ribbon tape T is calculated by totaling the lengths necessary for preparing the ribbon decoration and for the ribbon wrapping. If the "without a knot" is selected as the type of the ribbon decoration, the lengths necessary for preparing the ribbon decoration and for the ribbon wrapping are calculated separately. In the former case, the print data generation unit 56 generates print data for generating one ribbon tape T. In the latter case, the print data generation unit 56 generates print data for preparing two ribbon tapes T (for the ribbon decoration and for the ribbon wrapping).

Figure 10:
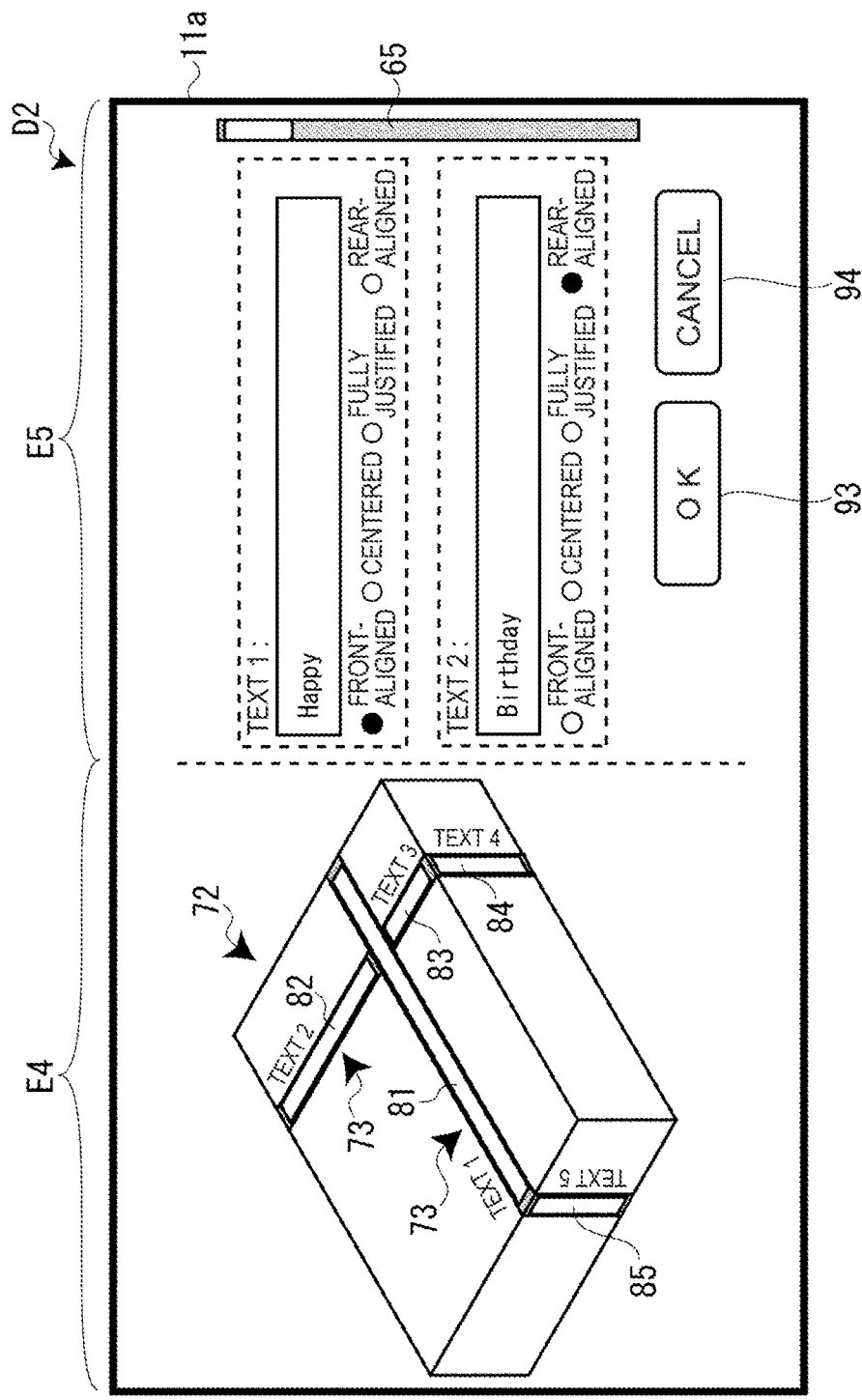
FIG. 10 shows an example of a text editing screen according to the second embodiment.

The display unit 51 in this embodiment displays an object preview 72 which is a preview of the object to be wrapped B, a ribbon wrapping preview 73 which is a preview of the ribbon tape T laid around the object to be wrapped B, and a ribbon decoration preview 71 which is a preview of the ribbon decoration arranged on the object to be wrapped B, according to the setting by the setting unit 52 (see FIG. 10). However, if "none" is selected as the type of the ribbon decoration, the ribbon decoration preview 71 is not displayed. Also, one or more printable areas 80 are displayed on the ribbon decoration preview 71 and the ribbon wrapping preview 73. The arrangement of the ribbon wrapping preview 73 on the object preview 72 (the position of crossing in the case of the "cross", or the like) is automatically decided according to the set type of the ribbon wrapping and the dimensions of the object to be wrapped B.

Figure 8A:
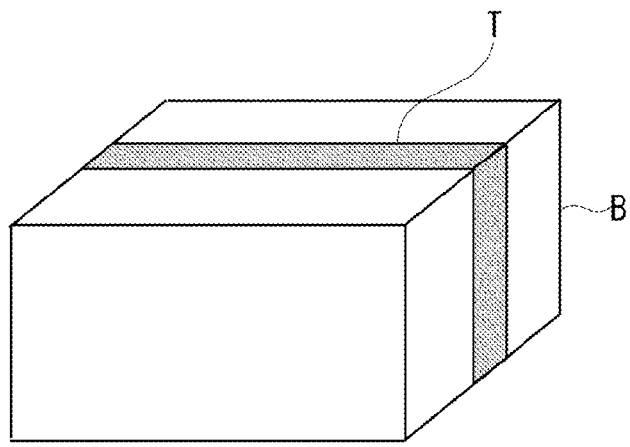
FIGS. 8A to 8C show specific examples of ribbon wrapping and ribbon decoration.
Figure 8B:
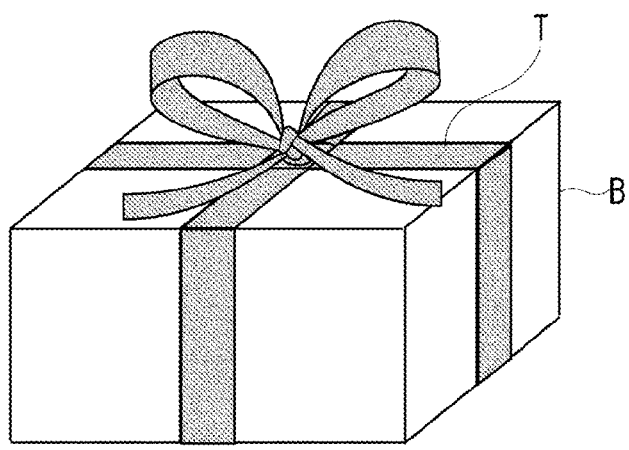
Figure 8C:
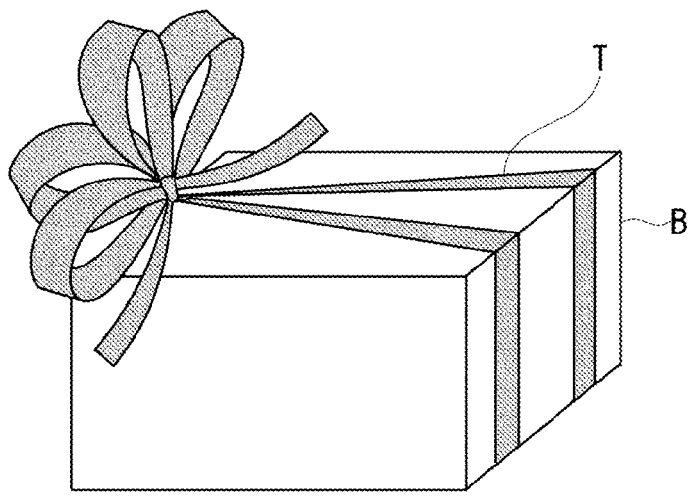

FIGS. 8A to 8C show specific examples in which the object to be wrapped B in the shape of a rectangular parallelepiped (box) is wrapped. In FIGS. 8A to 8C, the illustration of the print image 21 is omitted. FIG. 8A is shows an example of wrapping in the case where the type of the ribbon wrapping is "horizontal line" and where the type of the ribbon decoration is "none". If the ribbon decoration is "none", both ends of the ribbon tape T are bonded together via an adhesive tape or the like. FIG. 8B shows an example of wrapping in the case where the type of the ribbon wrapping is "cross" and where the type of the ribbon decoration is "single-loop bow (with a knot)". FIG. 8C shows an example of wrapping in the case where the type of the ribbon wrapping is "sideways triangle" (V-wrapping) and where the type of the ribbon decoration is "double-loop bow (with a knot)".

Figure 9:
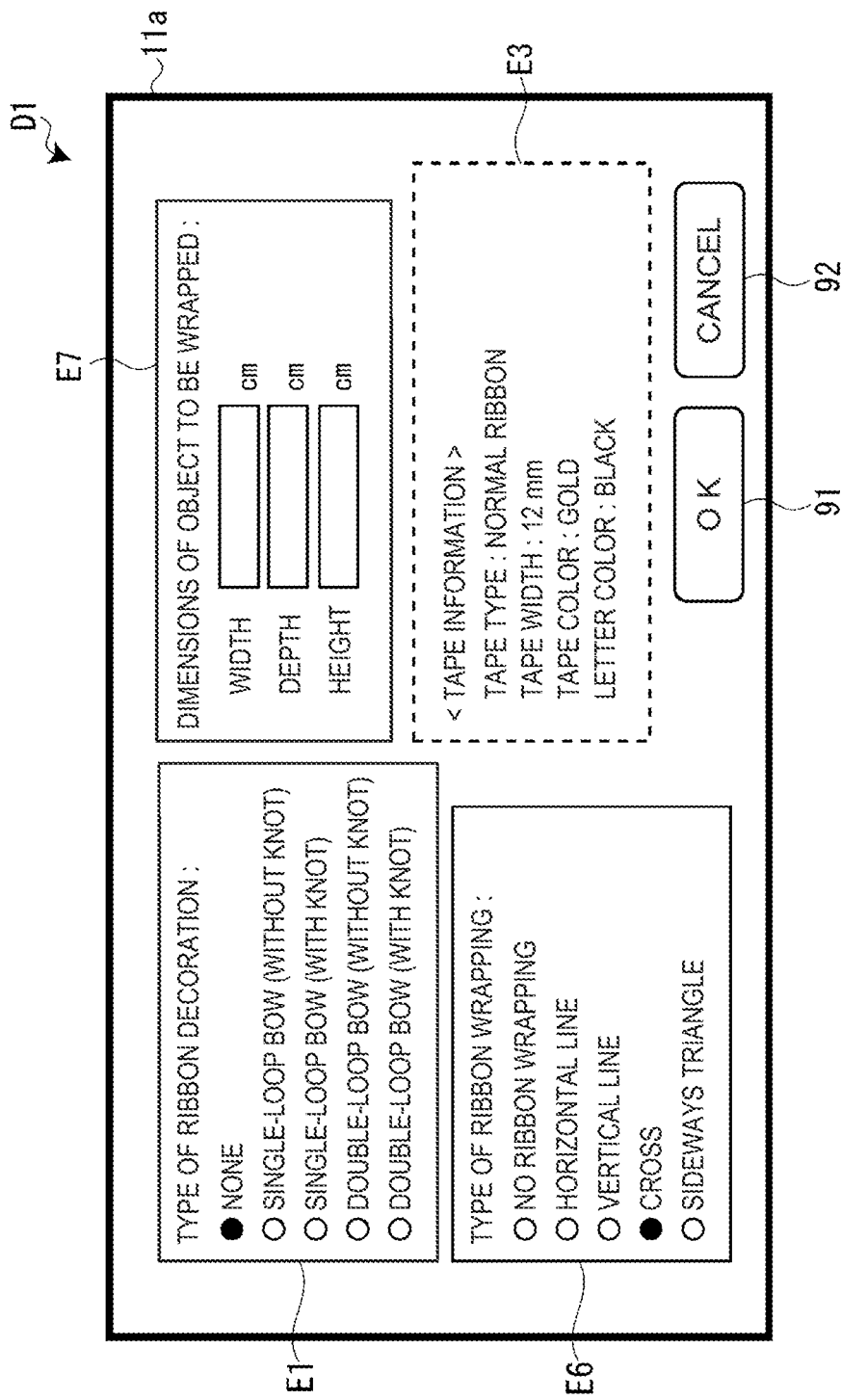
FIG. 9 shows an example of a setting screen according to a second embodiment.

FIG. 9 shows an example of a setting screen D1 according to the second embodiment. The setting screen D1 includes a ribbon decoration selection area E1, a ribbon wrapping selection area E6, a dimension input area E7, and a tape information display area E3. In the ribbon decoration selection area E1, "none" can be selected as the type of the ribbon decoration.

In the ribbon wrapping selection area E6, the type of the ribbon wrapping is selected. In this embodiment, one of "no ribbon wrapping", "horizontal line" (see FIG. 8A), "vertical line", "cross" (see FIG. 8B), and "sideways triangle" (see FIG. 8C) can be selected. The "vertical line" is the way of laying the ribbon tape T in a direction that crosses the "horizontal line" shown in FIG. 8A. In the case of the "horizontal line", the ribbon tape T is laid in the direction of the width of the object to be wrapped B. In the case of the "vertical line", the ribbon tape T is laid in the direction of the depth. The "no ribbon wrapping" is selected in the case of preparing the ribbon decoration only. Meanwhile, in the dimension input area E7, numeric values of the "width", "depth" and "height" are inputted on the assumption that the object to be wrapped B is a rectangular parallelepiped.

FIG. 10 shows an example of a text editing screen D2 according to the second embodiment. In a preview display area E4 on the text editing screen D2, an object preview 72 which is a preview of the object to be wrapped B, and a ribbon wrapping preview 73 are displayed. Here, the object preview 72 is displayed three-dimensionally on the basis of the dimensions inputted in the dimension input area E7, and the ribbon wrapping preview 73 is displayed on the basis of the result of the selection in the ribbon wrapping selection area E6. Also, if a type of the ribbon decoration that is not "none" is selected in the ribbon decoration selection area E1 on the setting screen D1, the ribbon decoration preview 71 is displayed on the object preview 72. If a ribbon decoration "without a knot" is selected, the ribbon decoration preview 71 may be displayed separately from the object preview 72.

Also, in this embodiment, one or more printable areas 80 are displayed on the ribbon wrapping preview 73. In the illustrated example, the case where the "cross" is selected as the type of the ribbon wrapping is shown. In this case, five printable areas 81 to 85 are displayed. In this embodiment, too, each text inputted in the text editing area E5 is reflected on each corresponding printable area. The object preview 72 and the ribbon wrapping preview 73 can be rotated 360 degrees by the user's rotating operation (for example, an operation of touching the preview display area E4 and drawing a circle). That is, the user can visually confirm the object preview 72 from various angles. This rotating operation enables displaying the printable area 80 on the ribbon wrapping preview 73 laid on the surfaces that cannot be visually confirmed in the illustration, such as the back of the object preview 72. Meanwhile, in the text editing area E5, ten types of texts can be inputted corresponding to the total of ten printable areas 81 to 85 including the printable areas 80 that cannot be visually confirmed in the illustration. The text input areas other than the "text 1" and the "text 2" can be displayed by operating a scroll bar 65. However, it is not necessary to input a text in all the printable areas 80. It suffices to input a text in the areas which the user determines as necessary.

Although the illustration of the arrangements of the printable areas 80 on the ribbon wrapping preview 73 in the cases other than the case where the "cross" is selected as the type of the ribbon wrapping is omitted, the display unit 51, in principle, arranges the printable areas 80 on the basis of the type of the ribbon wrapping and the dimensions of the object to be wrapped B. That is, the display unit 51 arranges the printable areas 80 in areas excluding the crossing part of the ribbon wrapping preview 73, the vicinities of the corners of the object preview 72, and the part of the ribbon wrapping preview 73 narrowed by tying the ribbon (the triangle part in the case of the "sideways triangle" or the like; see FIG. 8C). As for the crossing part of the ribbon wrapping preview 73, the arrangement of the printable area 80 may be avoided on the lower ribbon tape at the overlap, as shown in FIG. 10, or the arrangement of the printable area 80 may be avoided both on the upper and lower ribbon tapes at the overlap. In the latter case, visual confirmation of the print image 21 is not obstructed even if the upper and lower ribbon tapes T at the overlap are reversed.

As described above, according to the second embodiment, the print image 21 can be arranged not only on the ribbon decoration but also on the ribbon part wrapped around the object to be wrapped B. Also, the print image 21 can be printed at a proper position on the ribbon tape T according to the dimensions of the object to be wrapped B and the type of the ribbon wrapping. Moreover, since the ribbon tape T is cut to a proper length according to the dimensions of the object to be wrapped B and the type of the ribbon wrapping, wasting of the ribbon tape T can be prevented.

While the two embodiments are described above, the following modifications can be employed in each of the embodiments.

Modification 1

Figure 11:
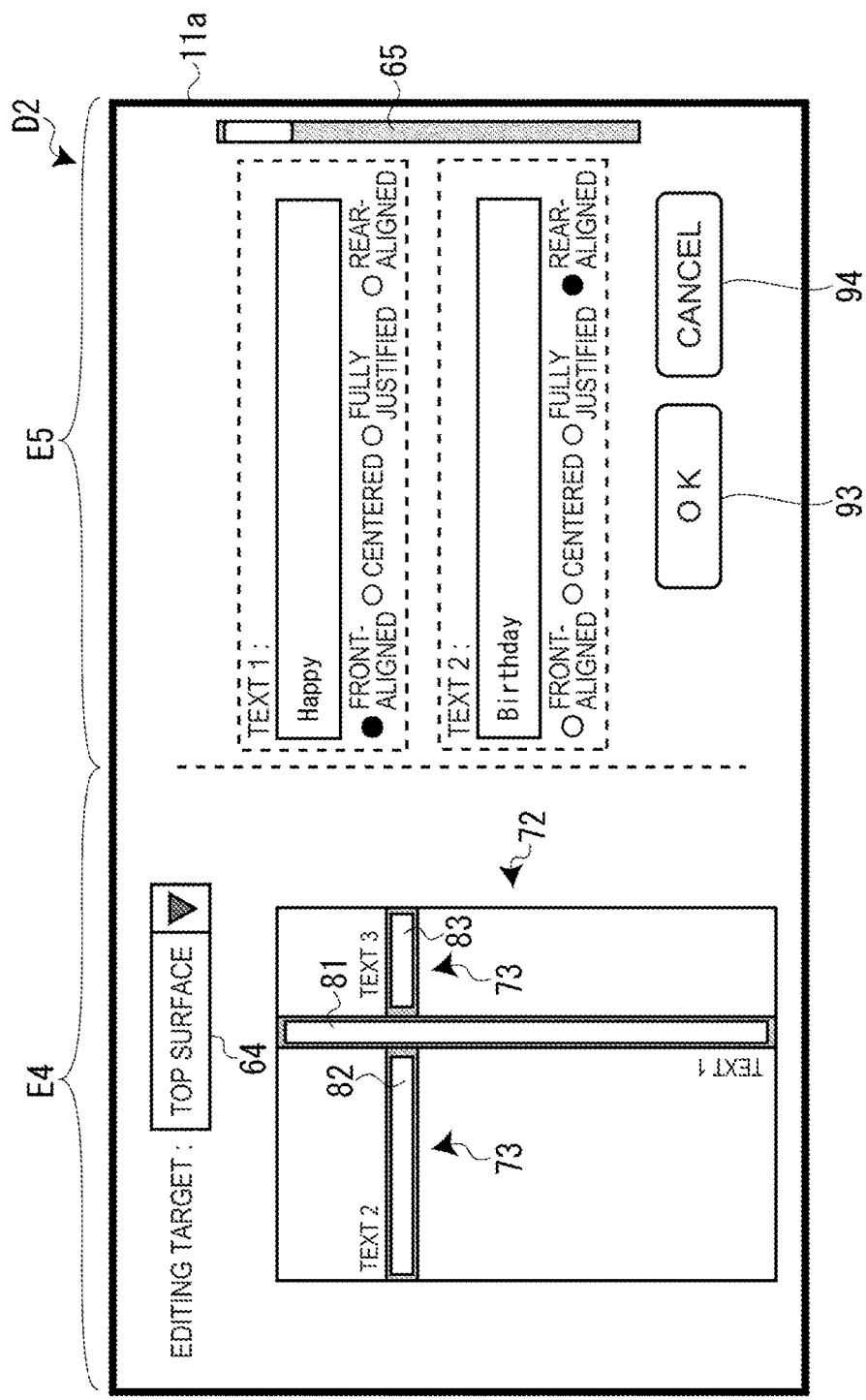
FIG. 11 shows an example of a text editing screen according to Modification 1.

In the second embodiment, the object preview 72 is displayed three-dimensionally in the preview display area E4 (see FIG. 10). However, the object preview 72 may be displayed two-dimensionally, as shown in FIG. 11. In this case, the user can select a surface to be an editing target of the object preview 72, using an editing target selection area 64. In this example, the surface with the largest area of the rectangular parallelepiped is defined as a "top surface", and the surface to be editing target is selected from the "top surface", "bottom surface", "right lateral surface", "left lateral surface", "front surface", and "rear surface".

Modification 2

Figure 12A:
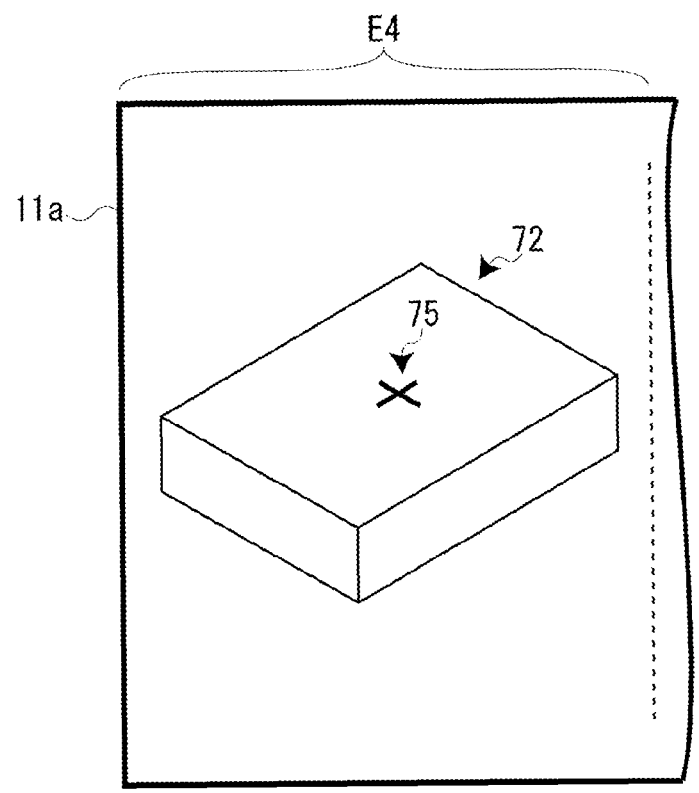
FIGS. 12A and 12B show an example of display of a preview display area according to Modification 2.
Figure 12B:
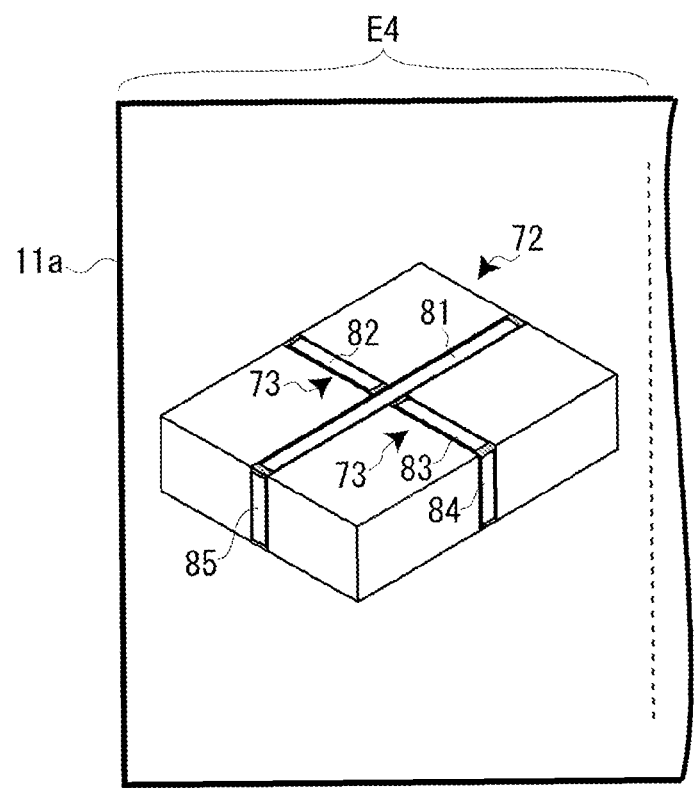

In the second embodiment, the arrangement of the ribbon wrapping preview 73 on the object preview 72 is automatically decided according to the type of the ribbon wrapping and the dimensions of the object to be wrapped B. However, a configuration in which the user can designate the arrangement may also be employed. For example, as shown in FIG. 12A, a cross mark 75 may be displayed on the object preview 72 and the position of this cross mark 75 may be changed by a drag operation or the like, thus enabling the designation of the crossing position of the ribbon wrapping preview 73 in the case where the type of the ribbon wrapping is the "cross". That is, if the cross mark 75 is designated as shown in FIG. 12A, the ribbon wrapping preview 73 is displayed as shown in FIG. 12B. Also, with the change of the crossing position of the ribbon wrapping preview 73, the length and area shape of the printable area 80 change as well. Moreover, the configuration in which the user can designate the arrangement of the ribbon wrapping preview 73 may also be employed in the case of a type of ribbon wrapping in which the length of the ribbon tape T and the arrangement of the printable area 80 change according to the arrangement of the ribbon wrapping preview 73 ("sideways triangle" or the like), other than the "cross".

Modification 3

In the second embodiment, the user inputs the numeric values of the dimensions of the object to be wrapped B. However, an image of the object to be wrapped B may be picked up (image pickup) and the dimensions of the object to be wrapped B may be set according to the result of the image pickup. According to this configuration, the dimensions of the object to be wrapped B can be set accurately and the time and effort of the user inputting the numeric values of the dimensions can be saved. Also, when picking up an image of the object to be wrapped B, the condition that a scale or predetermined comparative object (tape cartridge 31 or the like) should be included in the image pickup area may be employed. According to this configuration, the dimensions of the object to be wrapped B can be set more accurately.

Modification 4

Figure 13A:
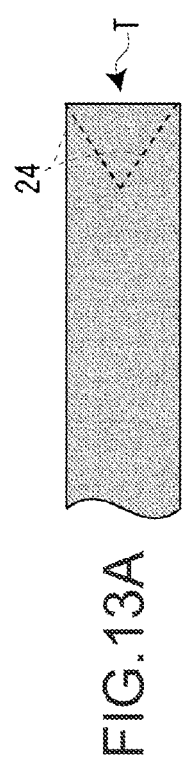
FIGS. 13A and 13B show examples of preparation of a ribbon tape according to Modification 4.
Figure 13B:
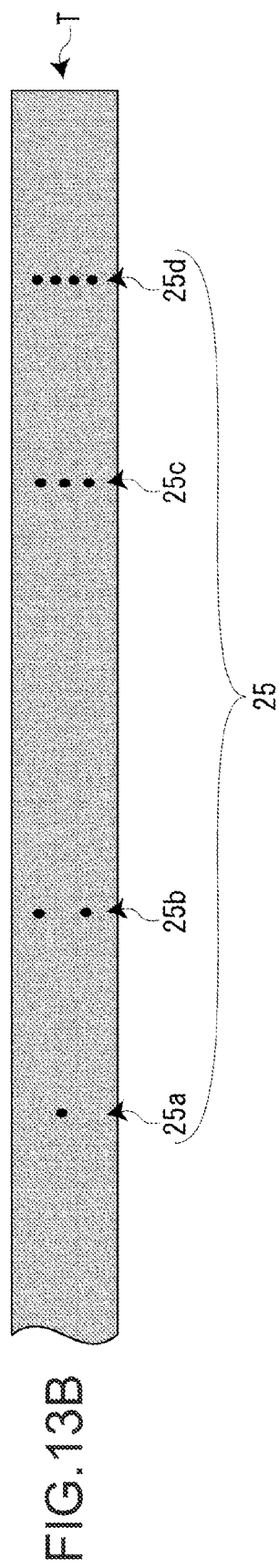

In the first embodiment, the guides 22 are printed on the ribbon tape T, aligned with the ribbon overlapping position of the ribbon decoration. However, various other marks may be printed. For example, as shown in FIG. 13A, cut lines 24 for cutting the end of the ribbon tape T in a V-shape may be printed. Also, as shown in FIG. 13B, marks 25 indicating the wrapping order may be printed at positions applied to the corners when laying the ribbon around the object to be wrapped B. In the illustrated example, the order of ribbon wrapping in the case where the "vertical line" is selected as the type of the ribbon wrapping is indicated by the numbers of dots. That is, by laying the ribbon in such a way that each position coincides with the corners of the object to be wrapped B in order of the mark 25*a*, the mark 25*b*, the mark 25c and the mark 25d, wrapping with a pleasant appearance can be achieved. As the marks 25, characters such as numbers or symbols may be printed other than dots.

As another modification, though not particularly illustrated, marks indicating the position start wrapping around the object to be wrapped B, the preparation target range of the ribbon decoration, the knot position of the ribbon decoration, and the like, may be printed. As for the "preparation target range of the ribbon decoration", if the ribbon wrapping and the preparation of the ribbon decoration are carried out with a single ribbon tape T and the ribbon decoration is prepared after the ribbon wrapping, simply the position to start the preparation of the ribbon decoration may be printed. Similarly, if the ribbon wrapping is carried out after the preparation of the ribbon decoration, simply the position to end the preparation of the ribbon decoration may be printed.

As still another modification, if double-side print is possible on the ribbon tape T, the guides 22 and the marks 25 may be printed on the surface (back surface) opposite to the print surface for the print image 21.

Modification 5

In the first embodiment, the ribbon tape T is supplied from the tape cartridge 31. However, the ribbon tape T need not necessarily be supplied from the tape cartridge. For example, the device may be configured in such a way that various commercially available decoration tapes can be loaded, and printing and cutting may be performed on the decoration tapes, thus preparing the ribbon tape T of the embodiment.

Modification 6

In the first embodiment, the ribbon decoration that can be prepared with a single ribbon tape T is described as an example. However, a ribbon decoration which needs a plurality of ribbon tapes T can also be prepared. In this case, a plurality of ribbon tapes T may be prepared. In this case, marks indicating the preparation order may be printed on each ribbon tape T.

Modification 7

In the first and second embodiments, the number of texts that can be inputted is limited according to the length of the printable area 80. However, the limitation on the number of texts may be eliminated. In this case, the printable area 80 may be expanded according to the number of inputted texts and the length of the ribbon tape T may be varied according to the expansion of the printable area 80.

Modification 8

The acquisition unit 55 in the first and second embodiments acquires a text inputted by the input unit 54. However, the acquisition unit 55 may also acquire a text read out from an external storage medium or may acquire a text transmitted form an external device. Also, a plurality of set phrases may be stored and the acquisition unit 55 may acquire a set phrase selected from these.

Modification 9

In the first embodiment, the arrangement of the printable area 80 on the ribbon decoration preview 71 is decided in advance according to the type of the ribbon decoration. However, a configuration in which the user can designate the printable area 80 at an arbitrary position on the ribbon decoration preview 71 may be employed. For example, the printable area 80 may be designated by writing a rectangular frame on the ribbon decoration preview 71 in the preview display area E4. In this case, the ribbon decoration preview 71 may be rotatable 360 degrees in its display by the user's rotating operation, as in the second embodiment. Moreover, it is also possible that the user can arbitrarily designate the arrangement of the printable area 80 on the ribbon wrapping preview 73 in the second embodiment.

Modification 10

Figure 14:
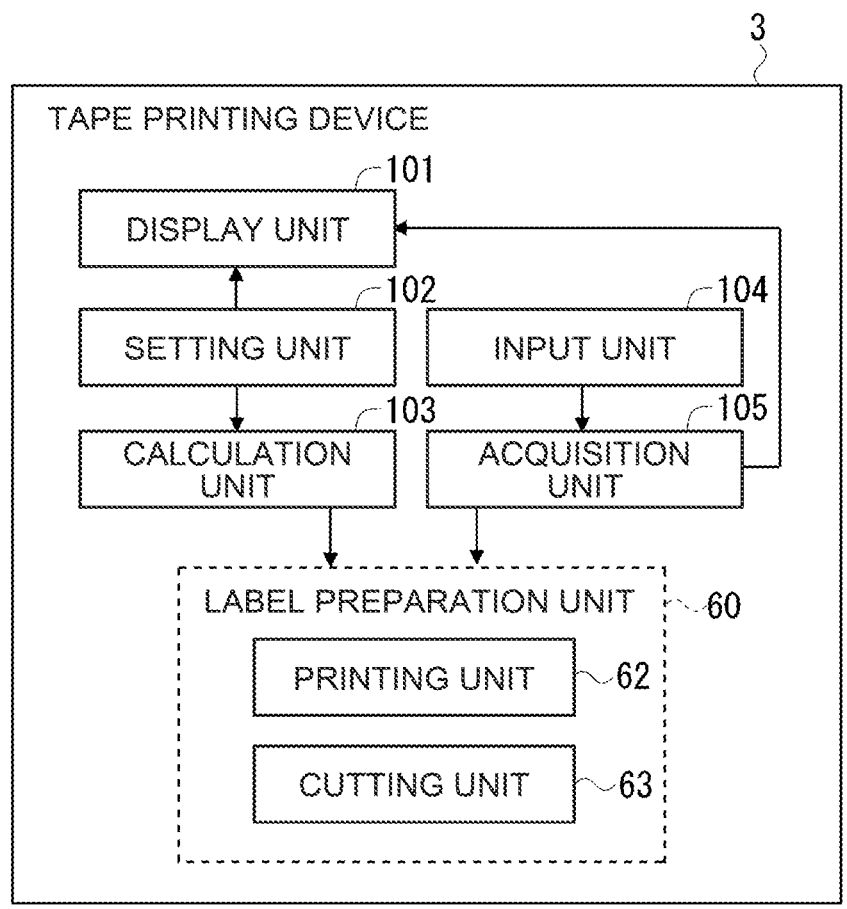
FIG. 14 is a block diagram showing the functional configuration of a tape printing device according to Modification 10.

In the first and second embodiments, the tape printing method according to the invention is implemented by the mobile terminal 1 and the tape printing device 3. However, the method may also be implemented by the tape printing device 3 alone. FIG. 14 is a block diagram showing the functional configuration of the tape printing device 3 according to this modification. The tape printing device 3 has a display unit 101, a setting unit 102, a calculation unit 103, an input unit 104, an acquisition unit 105, and a label preparation unit 60. The display unit 101, the setting unit 102, the calculation unit 103, the input unit 104, and the acquisition unit 105 correspond to the display unit 51, the setting unit 52, the calculation unit 53, the input unit 54, and the acquisition unit 55 in the first embodiment, respectively. The label preparation unit 60 includes a printing unit 62 and a cutting unit 63. The printing of the print image on the ribbon tape as described in the appended claims is implemented by the label preparation unit 60. The ribbon tape T described in the first and second embodiments can be prepared with the simple configuration of the tape printing device 3 only according to this modification.

Other Modifications

Each component of the mobile terminal 1 or the tape printing device 3 described in the embodiments and modifications may be provided as a program. Also, the program may be provided in the form of being stored in various recording media (CD-ROM, flash memory and the like). That is, a program for causing a computer to function as each component of the mobile terminal 1 or the tape printing device 3, and a recording medium with the program recorded therein, are included in the scope of rights of the invention. In addition, changes can be made according to need without departing from the scope of the invention, such as implementing each unit (each function) of the mobile terminal 1 or the tape printing device 3 by cloud computing, or implementing the mobile terminal 1 by another information processing device.

What is claimed is:

1. A ribbon preparation method comprising:
    displaying a plurality of printable areas on a ribbon decoration preview which is a preview of a completed ribbon decoration;
    setting a type of folding shape for the completed ribbon decoration made of a printed ribbon tape;
    acquiring information for printing a plurality of print images from a plurality of editing areas, each corresponding to one of the plurality of printable areas, where information regarding a print image to be printed in each of the plurality of printable areas is input; and
    printing the plurality of print images based on the acquired information, on a ribbon tape;
    wherein
    in the displaying of the plurality of printable areas, the ribbon decoration preview is displayed and a position of each printable area on the ribbon decoration preview is determined based on the type of folding shape that is set for the ribbon decoration, and
    in the printing of the plurality of print images, print positions of the plurality of print images on the ribbon tape are decided according to an arrangement of the plurality of printable areas on the ribbon decoration preview.

2. The ribbon preparation method according to claim 1, further comprising calculating a length of the ribbon tape necessary for preparing the ribbon decoration, according to the type of the ribbon decoration that is set,
wherein in the printing of the plurality of print images, the ribbon tape is cut to the calculated length, or a cut mark is printed on the basis of the length.

3. The ribbon preparation method according to claim 2, wherein in the setting of the type of folding shape for the ribbon decoration, a dimension of an object to be wrapped is set, and
in the calculation of the length of the ribbon tape, the length of the ribbon tape necessary for preparation of the ribbon decoration and for ribbon wrapping on the object to be wrapped is calculated according to the dimension of the object to be wrapped that is set.

4. The ribbon preparation method according to claim 3, wherein in the displaying of the plurality of printable areas, an object preview which is a preview of the object to be wrapped, a ribbon wrapping preview which is a preview of the ribbon tape wrapped around the object to be wrapped, and the ribbon decoration preview are displayed, and one or more of the plurality of printable areas are displayed on the ribbon wrapping preview and the ribbon decoration preview, and
in the acquisition of the information, the information that is different from one of the plurality of printable areas to another can be acquired.

5. The ribbon preparation method according to claim 4, wherein in the setting of the type of folding shape for the ribbon decoration, a type of ribbon wrapping around the object to be wrapped is set,
in the displaying of the plurality of printable areas, the ribbon wrapping preview is displayed and the plurality of printable areas are arranged on the ribbon wrapping preview, according to the type of the ribbon wrapping that is set, and
in the calculation of the length of the ribbon tape, the length of the ribbon tape is calculated according to the type of the ribbon wrapping that is set.

6. The ribbon preparation method according to claim 3, further comprising picking up an image of the object to be wrapped,
wherein in the setting of the type of folding shape for the ribbon decoration, the dimension of the object to be wrapped is set according to a result of the image pickup.

7. The ribbon preparation method according to claim 3, wherein in the printing of the plurality of print images, a mark indicating at least one of a position to start wrapping around the object to be wrapped, a position to be applied at a corner of the object to be wrapped, a preparation target range of the ribbon decoration, a knot position of the ribbon decoration, and a ribbon overlapping position of the ribbon decoration, is printed on the ribbon tape.

8. A tape printing device comprising:
a display which displays a plurality of printable areas on a ribbon decoration preview which is a preview of a completed ribbon decoration;
at least one processor that executes one or more programs stored in a non-transitory computer-readable storage medium that comprises computer executable instructions to realize one or more functions of:
a setting unit which sets a type of folding shape for the completed ribbon decoration made of a printed ribbon tape; and
an acquisition unit which acquires information for printing a plurality of print images from a plurality of editing areas, each corresponding to one of the plurality of printable areas, where information regarding a print image to be printed in each of the plurality of printable areas is input; and
a printer which prints the plurality of print images based on the information acquired by the acquisition unit, on a ribbon tape;
wherein
on the display, the ribbon decoration preview is displayed and a position of each printable area on the ribbon decoration preview is determined based on the type of folding shape that is set for the ribbon decoration, and
the printer prints the plurality of print images on the ribbon tape at print positions coinciding with an arrangement of the plurality of printable areas on the ribbon decoration preview.

9. A non-transitory computer-readable storage medium comprising a program configured to cause a computer to execute:
displaying a plurality of printable areas on a ribbon decoration preview which is a preview of a completed ribbon decoration;
setting a type of folding shape for the completed ribbon decoration made of a printed ribbon tape;
acquiring information for printing a plurality of print images from a plurality of editing areas, each corresponding to one of the plurality of printable areas, where information regarding a print image to be printed in each of the plurality of printable areas is input; and
generating print data for printing the plurality of print images based on the acquired information, on a ribbon tape;
wherein
in the displaying of the plurality of printable areas, the ribbon decoration preview is displayed and a position of each printable area on the ribbon decoration preview is determined based on the type of folding shape that is set for the ribbon decoration, and
in the generating of the print data, print positions of the plurality of print images on the ribbon tape are decided according to an arrangement of the plurality of printable areas on the ribbon decoration preview.

10. The ribbon preparation method according to claim 1, wherein
in the ribbon decoration preview, the plurality of printable areas are each positioned based on the type of folding shape that is set for the ribbon decoration, and
in the acquiring of the information for printing the plurality of print images, separate print information is acquired for each of the plurality of printable areas.

11. The ribbon preparation method according to claim 4, wherein
in the ribbon wrapping preview, the ribbon tape is divided into a plurality of sections wherein each of the plurality of sections corresponds to one of a plurality of surfaces of the object to be wrapped,
each of the plurality of sections includes at least one printable area, and
in the acquiring of the information for printing the plurality of print images, separate print information is acquired for each printable area corresponding to each of the plurality of sections of ribbon tape.

* * * * *